(12) United States Patent
Nien O et al.

(10) Patent No.: US 10,617,894 B2
(45) Date of Patent: Apr. 14, 2020

(54) COMPOSITIONS FOR REDUCING INHALATION OF TOXIC AIR POLLUTION COMPONENTS

(71) Applicant: Innonix Technologies, Inc., Hong Kong (HK)

(72) Inventors: Wylie Wing Nien O, Hong Kong (HK); Neal George Stewart, Hong Kong (HK); Reid Warren von Borstel, Hong Kong (HK)

(73) Assignee: Innonix Technologies, Incorporated, Shatin (HK)

( * ) Notice: Subject to any disclaimer, the term of this patent is extended or adjusted under 35 U.S.C. 154(b) by 444 days.

(21) Appl. No.: 15/394,265

(22) Filed: Dec. 29, 2016

(65) Prior Publication Data

US 2017/0281993 A1    Oct. 5, 2017

Related U.S. Application Data

(60) Provisional application No. 62/390,664, filed on Apr. 5, 2016.

(51) Int. Cl.
*A62B 23/02*     (2006.01)
*C09D 5/02*      (2006.01)
(Continued)

(52) U.S. Cl.
CPC ............ *A62B 23/025* (2013.01); *A62B 9/006* (2013.01); *A62D 5/00* (2013.01); *B01D 39/1623* (2013.01);
(Continued)

(58) Field of Classification Search
CPC ...... C09D 129/04; C09D 139/06; C09D 5/00; C09D 5/024; C09D 7/61; C09D 7/63;
(Continued)

(56) References Cited

U.S. PATENT DOCUMENTS 3,378,348 A    4/1968   McConnaughey
3,574,552 A    4/1971   Rakowski
(Continued)

FOREIGN PATENT DOCUMENTS

WO    WO-2012064894 A1 *  5/2012   ........... C09B 47/045

*Primary Examiner* — Arti Singh-Pandey
(74) *Attorney, Agent, or Firm* — Trojan Law Offices (57) ABSTRACT

The present invention relates to a composition, textile, and mask for reducing the inhalation of pollutants. The composition includes an aqueous solution of an inorganic iodide compound, a metal phthalocyanine, and a polymeric binder. The inorganic iodide can be cuprous iodide, the metal phthalocyanine can be iron phthalocyanine, and the polymeric binder can be polyvinylpyrrolidone or polyvinyl alcohol. This pollutant-inactivating composition neutralizes pollutants such as nitrogen dioxide, sulfur dioxide, ozone, volatile organic compounds and other unpleasant airborne agents, without requiring elevated temperatures or bulky canisters containing adsorbents. Optionally, a humectant can also be incorporated into the coating solution to retain moisture in the active filter matrix, which enhances the activity of the composition to inactivate oxidizing gases and other toxic constituents of air pollution.

9 Claims, 5 Drawing Sheets

(51) Int. Cl.
| | |
|---|---|
| C09D 7/63 | (2018.01) |
| C09D 7/61 | (2018.01) |
| A62D 5/00 | (2006.01) |
| D06M 13/35 | (2006.01) |
| D06M 13/352 | (2006.01) |
| D06M 13/50 | (2006.01) |
| D06M 11/13 | (2006.01) |
| A62B 9/00 | (2006.01) |
| B01D 39/16 | (2006.01) |
| B01D 53/56 | (2006.01) |
| B01D 53/82 | (2006.01) |
| B60H 3/06 | (2006.01) |
| C09D 5/00 | (2006.01) |
| C09D 129/04 | (2006.01) |
| D06M 15/333 | (2006.01) |
| D06M 15/356 | (2006.01) |
| C08K 3/16 | (2006.01) |
| C08K 3/22 | (2006.01) |
| C08K 5/00 | (2006.01) |
| C09D 139/06 | (2006.01) |
| D06M 101/20 | (2006.01) |
| D06M 101/32 | (2006.01) |

(52) U.S. Cl.
CPC ............ B01D 53/565 (2013.01); B01D 53/82 (2013.01); B60H 3/06 (2013.01); C09D 5/00 (2013.01); C09D 5/024 (2013.01); C09D 7/61 (2018.01); C09D 7/63 (2018.01); C09D 129/04 (2013.01); D06M 11/13 (2013.01); D06M 13/35 (2013.01); D06M 13/352 (2013.01); D06M 13/50 (2013.01); D06M 15/333 (2013.01); D06M 15/3562 (2013.01); B01D 2239/0478 (2013.01); B01D 2239/0492 (2013.01); B01D 2239/065 (2013.01); B01D 2239/0622 (2013.01); B01D 2239/0627 (2013.01); B01D 2257/404 (2013.01); C08K 3/16 (2013.01); C08K 5/0091 (2013.01); C08K 2003/2241 (2013.01); C09D 139/06 (2013.01); D06M 2101/20 (2013.01); D06M 2101/32 (2013.01)

(58) Field of Classification Search
CPC .... C08K 3/00; C08K 2003/2241; C08K 3/16; C08K 5/0091; C08L 39/06; A62B 23/025; A62B 9/006; A62D 5/00; B01D 2239/0478; B01D 2239/0492; B01D 2239/0622; B01D 2239/0627; B01D 2239/065; B01D 2257/404; B01D 39/1623; B01D 53/565; B01D 53/82; B60H 3/06; D06M 11/13; D06M 13/35; D06M 13/352; D06M 13/50; D06M 15/333; D06M 15/3562; D06M 2101/20; D06M 2101/32
See application file for complete search history.

(56) References Cited

U.S. PATENT DOCUMENTS

| | | |
|---|---|---|
| 4,348,358 A | 9/1982 | McKee |
| 2010/0221307 A1* | 9/2010 | Matsushita .......... A61K 31/555 424/443 |

* cited by examiner

COMPOSITIONS FOR REDUCING INHALATION OF TOXIC AIR POLLUTION COMPONENTS

CROSS-REFERENCE TO RELATED APPLICATIONS

This application claims priority to U.S. Provisional Patent Application 62/390,664, filed Apr. 5, 2016.

FIELD OF THE DISCLOSURE

The present invention relates to airborne pollutant inactivating compositions, and more specifically, compositions that can be applied to textiles for use in face masks or filters.

BACKGROUND OF THE INVENTION

Air pollution is a major public health hazard, contributing to several million premature deaths annually worldwide. Air pollution directly promotes cardiovascular and respiratory diseases, and can trigger or exacerbate asthma and allergy attacks, and has been found to impair brain and lung development in children. Air pollution comprises several classes of toxic constituents. The most important components of air pollution as public health hazards are particulate matter and oxidizing gases, especially nitrogen dioxide, sulfur dioxide and ozone. Additional air pollution constituents that represent health hazards in some environments include combustion products, including carbon monoxide and carcinogenic polycyclic aromatic hydrocarbons (PAHs); volatile organic compounds (VOCs) including formaldehyde; inorganic volatiles such as mercury vapor, ammonia; allergens; and odorants such as hydrogen sulfide and sulfhydryl compounds.

Much of the analysis of health risks of air pollution has focused on particulate matter, especially particles with diameters on the order of 2.5 microns or less (PM2.5), as particles in this size range are inhaled more deeply into the airways and lungs than particles of other sizes. Particulate matter may contain toxins or carcinogens and may also provoke inflammatory responses in the airways by delivering allergens or irritants that activate macrophages or eosinophils.

In addition to particulate matter, non-particulate compounds, notably oxidizing gases, especially nitrogen dioxide, sulfur dioxide and ozone, are gaining recognition as harmful constituents of air pollution. These oxidizing gases are produced by fuel combustion whenever air is used as an oxidant, and are particularly concentrated in urban environments. Internal combustion engines, particularly diesel engines, and fossil fuel-fired electricity generation are primary sources. In enclosed spaces, cooking with combusted fuels, including wood, propane, butane and natural gas, is a significant source of nitrogen dioxide.

Oxidizing gases can react with proteins, lipids and other classes of molecules on cells in the respiratory tract and cardiovascular system.

Nitrogen dioxide is a brown gas that contributes to the visual appearance of smog in air pollution over cities or industrial areas. When nitrogen dioxide was examined as a risk factor, the number of total annual deaths attributable to air pollution were almost twice as high as previously presumed, of which data are based only on particulate matter. Nitrogen dioxide is implicated as a causal factor in strokes, lung disease, sudden infant death, and cardiovascular disease. Its reactivity and harmfulness are exacerbated by concurrent exposure to other constituents of air pollution including ozone, a radical initiator in the presence of sunlight, causing more-than-additive damage to biomolecules.

In specific environments, volatile compounds that are formed from combustion and industrial processes, in waste material, or by electrical sparks may be particularly concentrated, representing serious hazards to workers or observers. Indoor air pollution in poorly ventilated kitchen environments is a serious health hazard. Commuters are exposed to oxidizing gases and other pollutants from vehicles. Military armored vehicles can have extremely high interior concentrations of oxidizing gases, with nitrogen dioxide measured at transient peaks as high as 1000 parts per million (ppm). Air surrounding airports has high concentrations of nitrogen dioxide and other pollutants released during fuel combustion. Second hand smoke produced by combustion of tobacco products presents a local hazard; urban air pollution and tobacco smoke share some hazardous constituents in common, including polycyclic aromatic hydrocarbons, nitrogen dioxide, carbon monoxide and volatile organic compounds.

Existing personal respiratory protection devices for ordinary use, such as face masks or air filters, are able to capture particulate matter by mechanical filtration, but do not prevent inhalation of oxidizing gases or other non-particulate toxic volatile compounds. There exists a need for personal protection device, including masks or filters that neutralize or inactivate non-particulate airborne or volatile compounds including oxidizing gases, in addition to capturing harmful particulate matter.

BRIEF SUMMARY OF THE PRESENT INVENTION

The present disclosure describes novel pollutant-inactivating compositions that can be applied to textiles for use in personal protection products, including face masks, for reducing hazards associated with exposure to air pollution, including protection from oxidizing gases, polycyclic aromatic hydrocarbons, carbon monoxide, volatile organic compounds, ammonia, sulfhydryl odorants and other hazardous or unpleasant airborne agents. A pollutant-inactivating composition of the disclosure, in some embodiments, is applied to a textile or filter materials to inactivate air pollution constituents passing through the textile material.

The pollutant-inactivating system comprises an inorganic iodide compound, advantageously cuprous iodide (CuI), and a metal phthalocyanine, advantageously iron(II) phthalocyanine, in a polymeric matrix, advantageously polyvinylpyrrolidone. The polyvinylpyrrolidone polymer both binds the other components to the filter matrix, and traps molecular iodine produced by reaction of cuprous iodide with oxidizing gases, preventing the iodine from entering the inhaled airstream. The pollutant-inactivating composition also additionally comprises, in some embodiments, a humectant or hygroscopic agent to capture and retain moisture in the active filter matrix, including moisture provided by exhaled breath, in a device for personal protection such as a face mask. Moisture enhances the activity of the composition to inactivate oxidizing gases and other toxic constituents of air pollution.

The pollutant-inactivating system of the disclosure neutralizes oxidizing gases including nitrogen dioxide without requiring elevated temperatures or bulky canisters containing adsorbents. The disclosed compositions and methods of using them provides textiles or other filter matrices capable of rapidly inactivating major constituents of air pollution including combustion products and industrial pollutants that are otherwise not trapped by mechanical filtration alone. Embodied in a face mask format, compositions of the disclosure provide personal protection against hazardous or unpleasant constituents of air pollution.

One object of the invention is to provide a composition that, when applied to textiles or other filter matrices, neutralizes or converts toxic non-particulate constituents of air pollution to their non-toxic forms, thus reducing health hazards. Specific examples are oxidizing gases from air pollution, especially nitrogen dioxide, sulfur dioxide, and ozone.

Another object of the invention is to provide a composition for the neutralization of toxic non-particulate air pollution constituents without creating safety hazards to users or to the environment.

Another object of the invention is to provide a composition that, when incorporated into a face mask or other protective air filtration product, reduces exposure of a human to toxic non-particulate and particulate constituents in air pollution, and thereby reduces health hazards associated with exposure to air pollution, including cardiovascular and respiratory diseases, impaired brain and lung development, and exacerbation of asthma and allergic reactions. The composition includes an aqueous solution or suspension of an inorganic iodide compound, a metal phthalocyanine, and at least one polymeric binder; the composition is applied to a textile or other filtration material and dried, forming a thin layer that does not significantly obstruct airflow. In one embodiment, the inorganic iodide compound is cuprous iodide, the metal phthalocyanine is iron phthalocyanine, and the at least one polymeric binder is selected from at least one of polyvinylpyrrolidone and polyvinyl alcohol.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

In one embodiment of the invention, one or more layers of textile in a face mask constructed with multiple textile layers that are treated with a composition of the invention. In one embodiment, one or more treated textile layers are layered on either side with untreated porous textile materials, for example non-woven polypropylene, with one or more optional layers of meltblown polypropylene for mechanical particle filtration, which may be on either or both sides of the layer or layers treated with a pollutant-inactivating composition of the invention.

In one embodiment, compositions of the invention are used to impart anti-pollution activity to air filters used in ventilation systems for dwellings, garages, airports, office buildings, industrial buildings, ships and other enclosed places where people spend significant time and especially in the environment in and around automobiles, since automobiles and other road vehicles with internal combustion engines are a major source of nitrogen dioxide. In one embodiment, compositions and methods of the invention are employed for fabricating automobile cabin air filters that reduce exposure of occupants of a vehicle to toxic components of air pollution.

In addition to providing filtration media capable of reducing toxic or unpleasant constituents of polluted air passing through the filter, in other embodiments textiles modified with compositions of the disclosure are hung or suspended in an interior environment where they neutralize ambient oxidizing gases and other hazardous or undesirable volatile compounds. For example, a modified textile coated with the pollutant-inactivating composition of the disclosure is hung or mounted in a kitchen, industrial facility, garage or other environment with concentrated ambient air pollution, reducing the exposure of subjects in that environment to volatile compounds and odorants.

Pollutant-Inactivating Compositions of the Invention

Cuprous Iodide.

A principle component of compositions of the invention is an inorganic iodide. These include aluminum iodide ($AlI_3$/$Al_2I_6$), ferrous iodide ($FeI_2$), ferric iodide ($FeI_3$), copper(II) iodide ($CuI_2$), cuprous iodide (CuI), zinc(II) iodide ($ZnI_2$), ammonium iodide ($NH_4I$), potassium iodide (KI), sodium iodide (NaI), and tetrabutylammonium iodide (n-$Bu_4NI$). In one embodiment of the invention, cuprous iodide (CuI) is adapted in the pollutant-inactivating compositions for scavenging oxidizing gases.

Cuprous iodide (CuI) is a stable compound, not a binary iodide salt; it is in fact an inorganic polymer that exists in different crystalline lattices, and is essentially insoluble in water. In one embodiment, iodide salts of copper(I) are used, but copper salts in +2 or 0 oxidation states can be utilized as well. When incorporated into compositions of the invention and applied to textiles, the polymeric iodide compound in its solid form reacts with several toxic air pollution constituents, include oxidizing gases (including but not limited to nitrogen dioxide and ozone), mercury vapor, and some volatile organic compounds (VOCs).

There are several methods for preparing microparticles or nanoparticles of cuprous iodide, all of which are suitable for preparing CuI for incorporation into the composition of the invention. Such methods include milling in standard powder mills, or by solvent precipitation, such as using acetonitrile, in which a copper(I) complex solvate is formed upon dissolution in that solvent, and is precipitated by slow diffusion of a saturated solution containing the metal complex into a miscible solvent that is less soluble for that metal complex. The resulting nanoparticles are collected by filtration and/or centrifugation.

The mesh size of CuI suitable for application to filter textiles ranges from 50 to 300 microns.

Iron Phthalocyanine.

Iron phthalocyanine (FePc) is an inorganic compound comprising iron chelated in the center of a planar phthalocyanine ring. The iron center in this molecule retains capability to undergo redox reactions, with corresponding changes in its oxidation state while still being immobilized by chelation. The planar phthalocyanine moiety can coordinate a variety of volatile organic compounds and other hydrophobic molecules including proteins. Iron phthalocyanine inactivates or adsorbs as well a variety of toxic or odorous molecules found in air pollution, including but not limited to sulfhydryl odorants including hydrogen sulfide; carbon monoxide, hydrogen cyanide, polycyclic aromatic hydrocarbons, and various volatile aromatic compounds.

Phthalocyanine coordination complexes of other transition metals are optional constituents of compositions of the invention, including cobalt(II) phthalocyanine (CoPc) or copper(II) phthalocyanine (CuPc); and halogenated derivatives at the metal, such as FePcX, CoPcX, CuPcX (X=Cl, Br, I). Iodinated iron phthalocyanine (FePcI) is known to bind iodine vapor in its crystal lattice.

The phthalocyanine ring structure of a metal phthalocyanine is optional derivatized with moieties that alter solubility, or which allows crafting to a substrate such as textile or a polymer by covalent or ionic bonding. Such substituents can include carboxylic acids (—COOH), carboxylates (—COOM, M=Na, K), sulfonates (—$SO_2$M, M=Na, K; —$SO_2$R, R=methyl, ethyl, n-propyl, isopropyl, n-butyl, sec-butyl, tert-butyl, iso-butyl, n-octyl), amines (—$NH_2$; —NHR, R=methyl, ethyl, n-propyl, isopropyl, n-butyl, sec-butyl, tert-butyl, iso-butyl, n-octyl; —$NR_2$, R=methyl, ethyl, n-propyl, isopropyl, n-butyl, sec-butyl, tert-butyl, iso-butyl, n-octyl), amides (—$CONH_2$; —CONHR, R=methyl, ethyl, n-propyl, isopropyl, n-butyl, sec-butyl, tert-butyl, iso-butyl, n-octyl; —$CONR_2$, R=methyl, ethyl, n-propyl, isopropyl, n-butyl, sec-butyl, tert-butyl, iso-butyl, n-octyl), or other ionizable substituents, or linker groups capable of covalent attachment to a textile or polymer.

Polymeric Binders Utilized in the Compositions of the Invention

For affixing the pollutant-inactivating compositions of the disclosure to textiles, especially relatively nonabsorbent thermoplastics or synthetics, a polymeric binding agent is used. Such a binder must keep the active reagents immobilized, but must also not restrict access of volatile molecules to the pollutant-inactivating composition.

Polyvinylpyrrolidone (PVP).

It is a biocompatible amphipathic polymer, with an early history of medical use as a plasma volume expander for maintaining blood volume when administered intravenously to hypovolemic trauma patients. PVP has subsequently found use as an adhesive and as a pharmaceutical excipient. PVP is a preferred binder for treating textiles with the pollutant-inactivating compositions of the disclosure. PVP can trap molecular iodine or oligoiodine species. A range of soluble PVP in water with various molecular weights (K Values) could be used, guided by adhesion properties required for a specific material.

For application to textiles, constituents of the compositions of the disclosure are mixed with an aqueous solution of PVP and applied by dipping, rolling or spraying, followed by drying, optionally assisted by application of heat.

Polyvinyl alcohol is a suitable binder for compositions of the invention, especially when combined with PVP. A partially hydrolyzed form of polyvinyl alcohol is preferable in the composition of the invention.

Other suitable binders that are useful as binders for compositions of the invention include modified cellulosic polymers, including but not limited to carboxymethylcellulose, methyl cellulose, hydroxypropylmethylcellulose, or ethylcellulose; and polyacrylates.

Iodine Trapping Agents in the Compositions of the Invention

Inactivation of oxidizing gases by redox reaction with cuprous iodide results in production of small amounts of molecular iodine ($I_2$) and triiodide ions ($I_3^-$). One feature of one embodiment of the composition is the inclusion of constituents that rapidly trap molecular iodine or oligoiodine species to prevent them from entering into the airstream passing through the filter material or mask.

Polyvinylpyrrolidone (PVP) is a suitable polymer with the ability to form stable iodine complexes. A solution of PVP-iodine (povidone-iodine) in water is used clinically as a topical disinfectant for skin. Typical povidone-iodine in its solid form contains 9-12% iodine.

When PVP is used as a binder for affixing composition constituents to a textile substrate, it has the advantageous secondary property of trapping molecular iodine formed by reaction of oxidizing gases with cuprous iodide. The PVP-iodine complex thus formed in turn imparts microbicidal activity to the filter, reducing risk of infection by airborne pathogenic viruses, bacteria or fungi.

When nylon is used as a textile or binder material, it is capable of absorbing large amounts of iodine and can be used as an iodine trap in one embodiment, especially when nylon impregnated with cuprous iodide is used as an active layer in a face mask or filter.

Other Examples of Iodine-Trapping Filter Constituents:

Binary iodine and oligo-iodine anions form complexes with amylose chains of starch. Starches with a relatively high ratio of amylose to amylopectin are preferred as iodine scavengers in compositions of the invention.

Copper salts of fatty acids bind and reduce molecular iodine to form stable iodide salts. Fatty acids, either saturated or unsaturated with 8 or more carbon atoms are preferred as fatty acids of this size or nonvolatile and odorless.

Metallic zinc reacts with molecular iodine or triiodide to yield zinc iodide (ZnI), which in turn can react with oxidizing gases in air pollution. Inclusion of metallic zinc in the active composition therefore both traps iodine formed by reaction of oxidizing gases with cuprous iodide and regenerates capability of the filter composition to inactivate additional molecules of oxidizing gases.

Silver salts react with molecular iodine, converting it to insoluble and stable silver iodide. Examples are silver nitrate, silver acetate and silver triflate.

Cyclodextrins, especially alpha-cyclodextrin with 6 glucose subunits and beta-cyclodextrin with 7 glucose subunits, can sequester or encapsulate iodine molecules; cyclodextrins thus are optional constituents of the pollutant-inactivating textile to augment its iodine-scavenging activity.

In addition to trapping iodine produced by reaction of cuprous iodide with oxidizing gases, the cyclodextrin-iodine complex generated in situ in turn provides additional protection against respirable airborne hazards, including neutralizing odorants such as hydrogen sulfide, methyl mercaptan, ammonia, trimethylamine, formaldehyde and acetaldehyde. Cyclodextrin-iodine complexes also impart anti-microbial activities.

Quantities of iodine-trapping agents are selected to ensure that the concentration of iodine vapor in the airstream passing through a mask or filter of the invention is kept below the permissible exposure limit (PEL) established by the Occupational Safety and Health Administration (OSHA) in the United States. The PEL for iodine vapor as ceiling limit is 0.1 ppm, and this is concentration may not be exceeded at any time.

Humidity and Humectants

Small amounts of moisture were unexpectedly found to strongly enhance the ability of the composition to inactivate nitrogen dioxide and other oxidizing gases.

The moisture in exhaled breath can been used to enhance activity for neutralizing oxidizing gases by including one or more humectant or hygroscopic agents in the composition, which retain moisture within the active layer. The inclusion of a humectant enables and enhances the feature of breath-activation of the pollution-neutralizing activity in a face mask, which improves stability prior to actual use, or between uses.

Suitable humectant agents include non-ionic surfactants comprising a sugar alcohol moiety, such as Tween 20, Tween 40, Tween 60 or Tween 80; sodium pyroglutamate, or sugar alcohols such as xylitol or sorbitol, propylene glycol or glycerol.

Titanium Dioxide

Titanium dioxide is a white pigment with photocatalytic properties. When exposed to ultraviolet light, including UV components of sunlight or artificial lighting, titanium dioxide can oxidize toxic gases, including nitrogen oxides, in air pollution. Furthermore, titanium dioxide is known to synergize with iron phthalocyanine in photo-degradation of organic pollutants including volatile organic compounds. Titanium dioxide is therefore useful as an optional constituent in some embodiments of compositions.

Typical Compositions of the Invention

A typical composition for treatment of textiles to impart pollutant-neutralizing activity would comprise 0.25 to 5% w/w cuprous iodide or other suitable iodides, 0.25 to 2% w/w iron phthalocyanine, 1 to 5% w/w polyvinylpyrrolidone, and optionally 0.5 to 1% w/w humectant, such as TWEEN 20, in an aqueous solution and suspension. This composition is agitated by mechanical stirring and heat prior to application to textile or other filter matrices. Other polymeric binders, such as polyvinyl alcohol or modified cellulosic material (1 to 5% w/w) are optionally added in the composition when required. Higher or lower concentrations of constituents in an aqueous vehicle are included within the scope of the invention, with the absolute concentration ranges guided by viscosity and by feasibility of application to a specific textile or other filter matrix without obstructing airflow, once the water has been largely removed by drying. Following application of the aqueous composition to a textile by immersion, spraying, or pouring, the textile is dried, optionally with assistance of heating or airflow or both, the ratios of non-volatile constituents affixed to the textile with the binding agent are maintained, with the moisture essentially removed.

Ratios of constituents comprising a composition of the invention before or following drying onto a textile or other filter matrix include 1 to 20 parts (by weight) cuprous iodide (or other iodide compound or salt); 1 to 8 parts iron phthalocyanine; 2 to 20 parts polyvinylpyrrolidone; optionally 1 to 4 parts humectant.

Example 1

Preparation of a Composition of the Invention

A solution containing polyvinylpyrrolidone (1% w/w), TWEEN 20 (0.5% w/w), and polyvinyl alcohol (1% w/w) was dissolved in deionized water with stirring at 80-90° C. Cuprous iodide (1% w/w) and iron phthalocyanine (1% w/w) were added to this solution and stirred until the solution was homogeneous, forming the stock solution. This solution was transferred to a beaker containing one third of volume of the stock solution, which was equilibrated to 50° C. The solution was stirred for subsequent application to fabric.

Treatment of Composition onto Textiles

Compositions of the invention are prepared with the assistance of heat and mechanical stirring in an aqueous solution of binder polymers and mixing it with cuprous iodide and iron phthalocyanine and optionally a humectant, yielding a combined solution and suspension, depending on aqueous solubility of each constituent.

The aqueous composition is applied to a textile such as polypropylene or polyester by dipping, spraying, rolling or other means, and allowed to dry, optionally with the assistance of heating or blown air.

Example 2

Application of a Composition of the Invention onto a Textile

A swatch of polyester, specifically Terylene (poly(ethylene terephthalate)), was immersed in a stirring slurry solution prepared by methods disclosed in Example 1. The reaction mixture was stirred for 1 minute at 50° C. The swatch was dried with excess solution removed by a roller, and it was further dried at 120° C. for 10 minutes.

Mask Textiles and Layers

The pollutant-inactivating compositions of the disclosure can be applied to a variety of different textiles or other filter matrices.

A preferred textile for coating with a composition of the invention is polyester, advantageously non-woven polyester. An objective for selecting textiles for treatment with compositions of the disclosure is to maximize the surface area, which is a function of the diameter and density of fibers, while still maintaining adequate airflow for comfortable breathing, when used as a face mask material. Therefore, the individual fibers of the textile should be as thin and dense as possible to maximize turbulence of airflow and to maximize surface area available for inactivation of pollution constituents, constrained by the need for airflow adequate for breathing comfortably. Other textiles are optionally used instead of or in combination with polyester, including but not limited to polypropylene, polyethylene, cellulosic such as rayon or cotton, or nylon.

Figure 5:
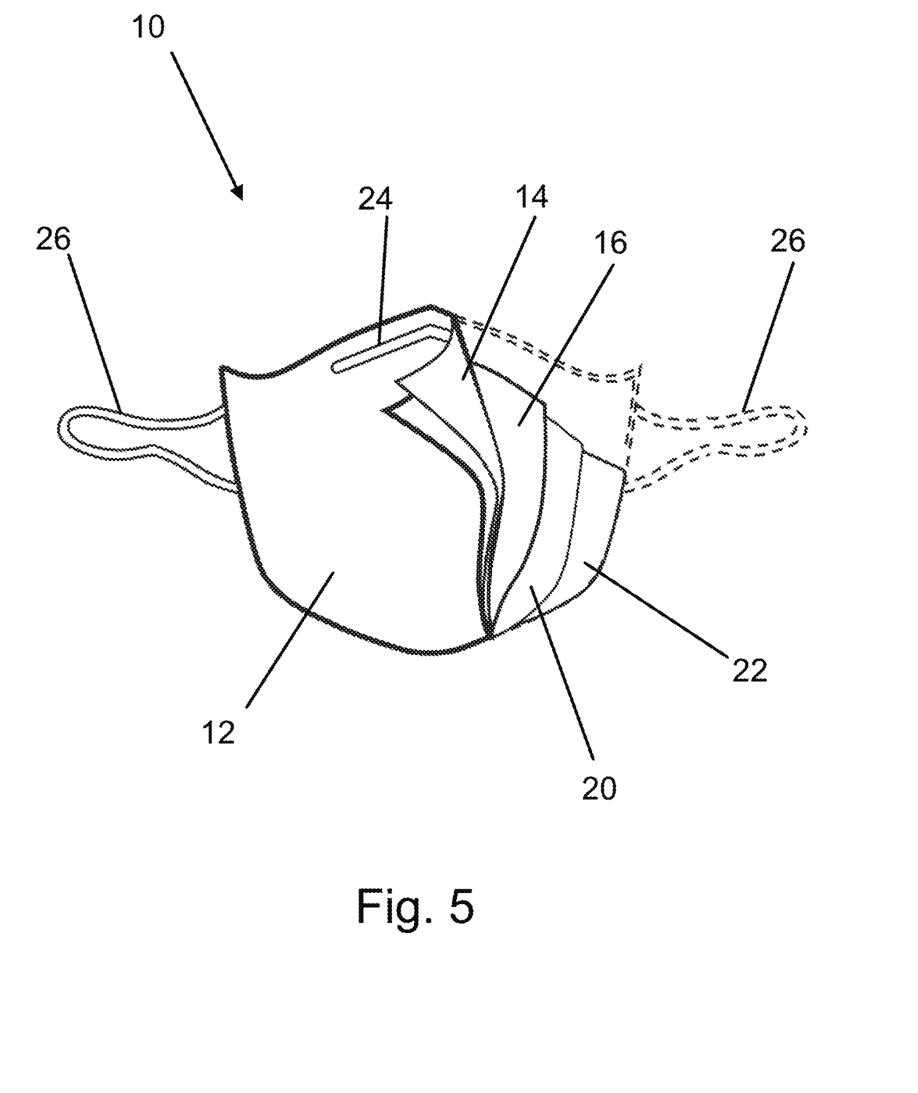
FIG. 5 is a front view of a face mask showing layers of textile for use in neutralizing oxidizing gases.

A face mask 10 comprises several layers of textiles, are laminated and shaped via conventional methods such as die-cutting and ultrasonic or thermal welding.

In one embodiment, shown in FIG. 5 the textile layers from outside to inside comprise the following:

1. Outer layer—spunbond polypropylene (12);
2. Meltblown polypropylene for mechanical particle filtration (14);
3. Polyester coated with a composition of the invention for inactivating oxidizing gases and other air pollution constituents (16);
4. Optional additional layer of polyester coated with a composition of the invention (not depicted);
5. Meltblown polypropylene for mechanical particle filtration (20);
6. Inner layer—spunbond polypropylene (22).

The face mask may have a nose bridge (24) and ear loops (26) or head loops (not depicted) to aid in placing and retaining the face mask (10) on the user's face. Face masks attachments having ear loops or head loops, as well as air filters and gas masks that may include the above described compositions are known in the art, such as those disclosed in U.S. patent application Ser. No. 13/319,836 to Stewart et al., and U.S. patent application Ser. No. 12/666,291 to Stewart et al., incorporated by reference in their entireties herein.

Inactivation of Oxidizing Gases by the Compositions of the Invention

Lower and ambient temperature trapping or neutralization of nitrogen dioxide is known in medical devices used for therapeutic inhalation of nitric oxide (NO) for treatment of pulmonary hypertension. Nitric oxide can be easily oxidized to nitrogen dioxide, and thereby presents a hazard to both patients and health care workers. Catalysts or adsorbents for removing nitrogen dioxide in delivery systems for therapeutic inhalation of nitric oxide or nitrous oxide are in the form of bulky canisters of agents such as soda lime or other granular compositions, which are not practical for a lightweight, unobtrusive personal protection mask. Furthermore, adsorbents or absorbents for removing nitrogen dioxide do not necessarily scavenge other toxic volatile constituents of air pollution.

Catalytic converters on automobiles are intended to degrade nitrogen oxides with precious metal catalysts, such as platinum, rhodium or palladium or alloys thereof, at high temperatures, ranging from 200 to 870 degrees C. While catalytic converters reduce output of nitrogen oxides in automobile exhaust, this technology is not practical for personal protection equipment.

Compositions of the invention and their embodiments as face masks or air filters rapidly inactivate, trap or convert a variety of toxic constituents of air pollution including oxidizing gases to their non-toxic form. Importantly, compositions of the invention are able to inactivate a significant amount of toxic air pollution constituents during a single passage of contaminated air through the face mask or filter material at airflow rates equivalent to breath inhalation. The inactivation of oxidizing gases and other toxic constituents of air pollution is accomplished at ambient temperatures without requirement for input of energy or heat.

For activity testing, a test article, typically in the form stacked textiles suitable as face mask or air filter materials, fitted in a filter cartridge, or suspended inside a test chamber, or using any other suitable sample holders, and is exposed to a constant flow and dynamic stream of oxidizing gas, including nitrogen dioxide and sulfur dioxide, in a single-pass flow-through system or in a closed system, typically in the form of a bell jar of thermoplastic material. The stream of oxidizing gas is usually diluted and balanced with an inert gas, typically nitrogen, and occasionally humidified up to 95% RH to simulate human breathe. The temperature inside the flow system, or in a closed system, is controlled, typically at 25 to 37 degrees Celsius. The flow rates of gases inside these test systems are adjusted to simulate volumetric flux of air across a mask material during human breathe.

The test articles are thereby challenged by varying the concentrations of oxidizing gases, temperature and humidity of the test chamber, and flow rates of diluted oxidizing gases balanced with an inert gas.

The amount of oxidizing gases absorbed and removed by the compositions of the invention and their embodiments as face masks or air filters, in the form of test articles prepared typically in the form of stacked textile of face mask or air filter materials, are quantified by measuring the difference in concentrations of gases at the inlet and outlet of a sample holder or equivalent fitted with the test article containing the compositions of the invention. The residual oxidizing gas from the outlet are typically feed into a test chamber, as in the flow system; or continuously circulated in the test chamber, as in the close system, and measured via a gas-specific electronic sensor connected to a data-logging device; or alternatively, connected to a sample train or an impinger trap containing a calibrated absorbing solution specific to the oxidizing gas to be analyzed. Examples including, but not limited to, the Saltzman reagent for the absorption of nitrogen dioxide, and West-Gaeke method for sulfur dioxide. The amounts of oxidizing gases are assayed by, including known analytical methods such as stoichiometric titration, gravimetric analysis, colorimetry, chromatography coupled with state-of-the-art spectrometric or spectroscopic techniques.

The rates of clearance of nitrogen dioxide from a composition of the invention by methods of Examples 1 and 2 applied to polyester are described in Examples 3 and 4, which show complete clearance (below limits of detection) of nitrogen dioxide starting at about 1600 ppb within 3-10 minutes (Table 1) in a closed system.

TABLE 1

| Example | Embodiment containing a Composition of the Invention | Initial Concentration of $NO_2$/ppb | Time of Clearance/ minutes | Temperature (Degrees Celsius) | Humidity (% RH) |
| --- | --- | --- | --- | --- | --- |
| 3 | Example 1 | 1661 | 3 | 29.4 | 80 |
| 4 | Example 2 | 1638 | 10 | 28.4 | 74 |

Example 3

Figure 1:
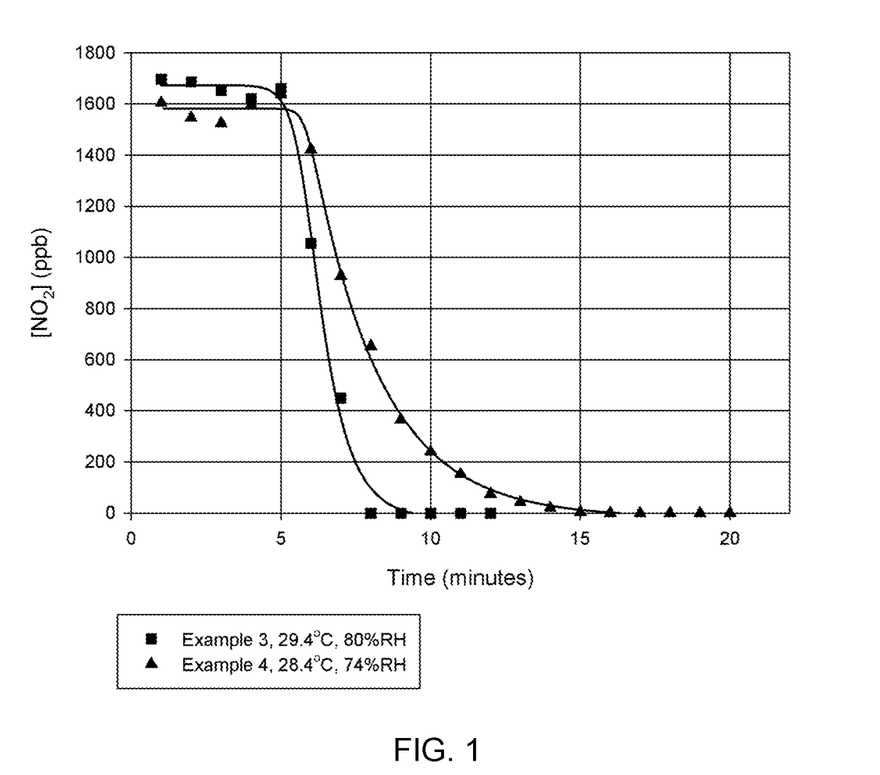
FIG. 1 is a graph showing the rate of clearance of nitrogen dioxide of examples described in Examples 3 and 4 from one or two stacked polyester layer(s) coated with the compositions of methods described in Examples 1 and 2 of the invention.

In one embodiment comprised of polyester layer coated with a composition of the invention for inactivating oxidizing gases by methods of Examples 1 and 2 with a surface area of 25 cm², this removed 1661 ppb of nitrogen dioxide within 3 minutes at 80% RH upon exposure in a closed system, with a dynamic flow of gases maintained at 2.5 m/s. The rate of clearance of nitrogen dioxide is illustrated in FIG. 1.

Example 4

Another embodiment of a test sample of representative filter material comprising a stack of two polyester layers coated with a composition of the invention for inactivating oxidizing gases by methods of Examples 1 and 2, with a surface area of 27 cm², removed 1638 ppb of nitrogen dioxide within 10 minutes at 74% RH upon exposure in a closed system, with a dynamic flow of gases maintained at 2.5 m/s. The rate of clearance of nitrogen dioxide is illustrated in FIG. 1.

Example 5

Figure 2:
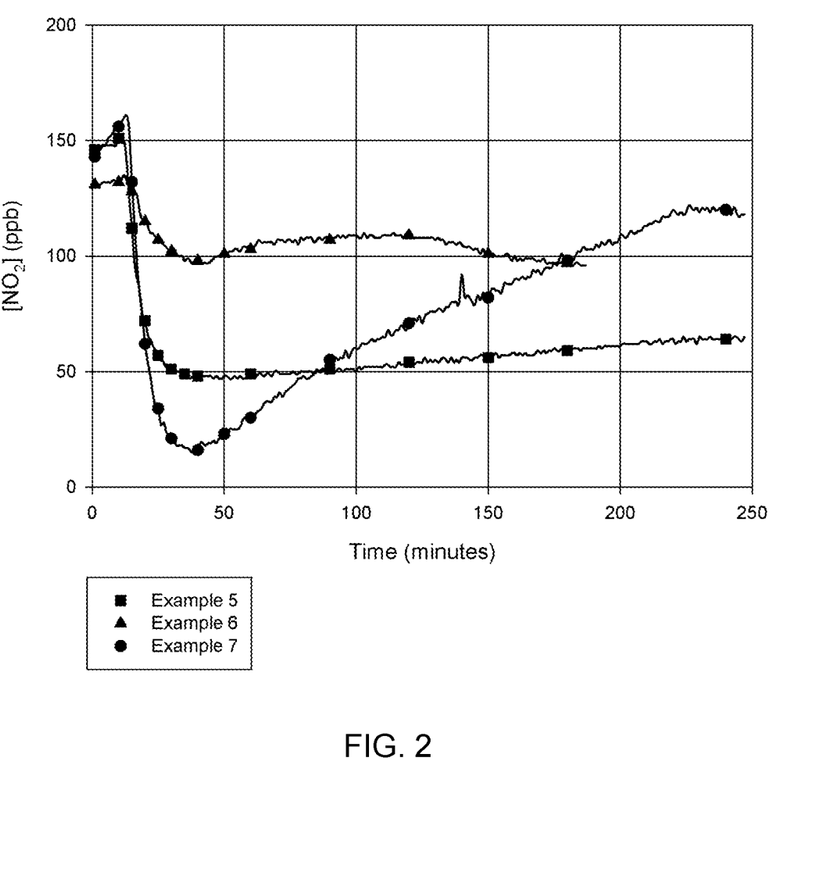
FIG. 2 is a graph showing the rate of clearance of nitrogen dioxide of examples described in Examples 5, 6 and 7 from stacked face mask material containing a polyester layer coated with the compositions of methods described in Examples 1 and 2 of the invention.

Another embodiment comprising stacked face mask materials containing a polyester layer coated with a composition of the invention for inactivating oxidizing gases by methods of Examples 1 and 2 with a surface area of 17.35 cm² removed 69% of nitrogen dioxide at 151 ppb in 27 minutes (Table 2) in a single-pass flow system at flow rate simulating human breathe, with temperature and humidity maintained at 37 degrees Celsius and 95% RH. The rate of clearance of nitrogen dioxide is illustrated in FIG. 2.

Example 6

In another embodiment comprised of stacked face mask materials containing a polyester layer without the composition of the invention for inactivating oxidizing gases with a surface area of 17.35 cm², this stack of material removed 28% of nitrogen dioxide at 135 ppb in 26 minutes (Table 2) in a flow system at flow rate simulating human breathe, with temperature and humidity maintained at 37 degrees Celsius and 95% RH. The rate of clearance of nitrogen dioxide is illustrated in FIG. 2.

TABLE 2

| Example | Initial Concentration of $NO_2$/ppb | Removal Efficacies (%) | Time of Clearance/ minutes | Temperature (Degrees Celsius) | Humidity (% RH) |
| --- | --- | --- | --- | --- | --- |
| 5 | 151 | 69 | 27 | 37 | 95 |
| 6 | 135 | 28 | 26 | 37 | 95 |

Effect of Moisture on Inactivation of Oxidizing Gases by Compositions of the Invention A small amount of moisture strongly enhances the ability of the composition to inactivate nitrogen dioxide, sulfur dioxide and other oxidizing gases.

The moisture in exhaled breath, typically when the embodiment is a face mask, can been used to enhance activity for neutralizing oxidizing gases by including one or more humectant or hygroscopic agents in the composition, which retain moisture within the active layer.

When the embodiment is a face mask material, the moisture in exhaled breath optimally contributes to at least 15% of weight gain of the pollutant-inactivating layer of textile material at steady state.

Example 7

One embodiment comprising stacked face mask materials containing a polyester layer coated with a composition of the invention for inactivating oxidizing gases by methods of Examples 1 and 2 with a surface area of 17.35 cm² was first pre-moistened by gently pressing the material between two lightly moistened paper towels to achieve a weight gain of 61%. This stack of material removed 91% of nitrogen dioxide at 161 ppb measured after 26 minutes (Table 3) in a single-pass flow system at flow rate simulating human breathe, with temperature and humidity maintained at 37 degrees Celsius and 95% RH. The rate of clearance of nitrogen dioxide is illustrated in FIG. 2.

Example 8

Figure 3:
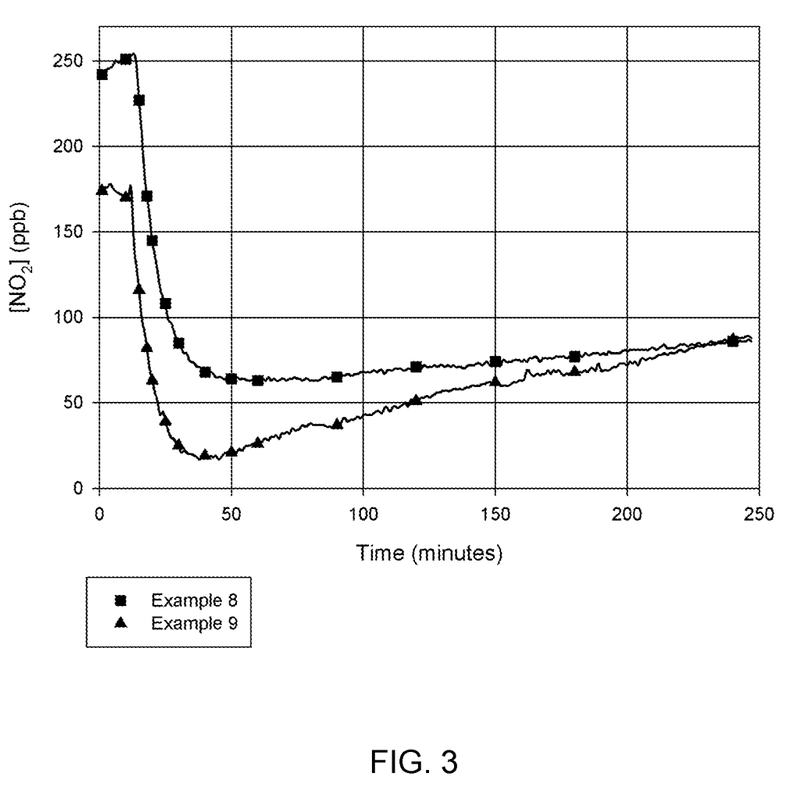
FIG. 3 is a graph showing the rate of clearance of nitrogen dioxide of examples described in Examples 8 and 9 from stacked face mask material containing a polyester layer coated with the compositions of methods described in Examples 1 and 2 of the invention.

Another embodiment comprising stacked face mask materials containing a polyester layer with a composition of the invention for inactivating oxidizing gases by methods of Examples 1 and 2 with a surface area of 17.35 cm² removed 75% of nitrogen dioxide at 254 ppb measured after 64 minutes of equilibration (Table 3) in a single-pass flow-through system at flow rate simulating human breathe, with temperature and humidity maintained at 37 degrees Celsius and 95% RH. The rate of clearance of nitrogen dioxide is illustrated in FIG. 3.

Example 9

One embodiment comprising stacked face mask materials containing a polyester layer coated with a composition of the invention for inactivating oxidizing gases by methods of Examples 1 and 2 with a surface area of 17.35 cm² was first pre-moistened by gently pressing the material between two moistened paper towel to achieve a weight gain due to absorbed moisture of 47%. This stack of material removed 90% of nitrogen dioxide at 176 ppb in 33 minutes (Table 3) in a flow system at flow rate simulating human breathe, with temperature and humidity maintained at 37 degrees Celsius and 95% RH. The rate of clearance of nitrogen dioxide is illustrated in FIG. 3.

TABLE 3

| Example | Weight gain of embodiment with soak (%) | Initial Concentration of NO$_2$/ppb | Removal Efficacies (%) | Time of Clearance/ minutes | Temperature (Degrees Celsius) | Humidity (% RH) |
|---|---|---|---|---|---|---|
| 7 | 61 | 161 | 91 | 26 | 37 | 95 |
| 8 | — | 254 | 75 | 64 | 37 | 95 |
| 9 | 47 | 176 | 90 | 33 | 37 | 95 |

Example 10

Figure 4:
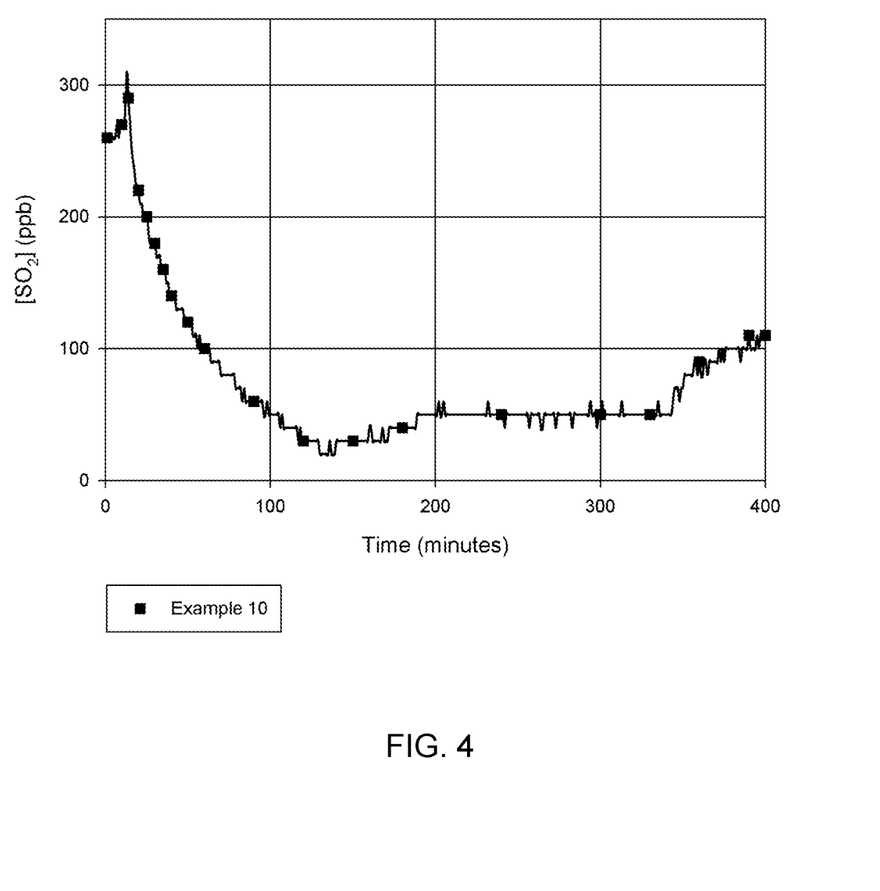
FIG. 4 is a graph showing the rate of clearance of sulfur dioxide of examples described in Example 10 from stacked face mask material containing a polyester layer coated with the compositions of methods described in Examples 1 and 2 of the invention.

One embodiment comprised of stacked face mask materials containing a polyester layer coated with a composition of the invention for inactivating oxidizing gases by methods of Examples 1 and 2 with a surface area of 17.35 cm$^2$ was first pre-moistened by gently pressing the material between two moistened paper towel to achieve a weight gain due to absorbed moisture of 22%. This stack of material removed 93% of sulfur dioxide at 310 ppb in 117 minutes in a single-pass flow-through system at flow rate simulating human breathe, with temperature and humidity maintained at 37 degrees Celsius and 95% RH. The rate of clearance of nitrogen dioxide is illustrated in FIG. 4.

Inactivation of Other Constituents in Air Pollution by the Compositions of the Invention Odorants.

Some constituents of air pollution may not be significant health hazards, but nonetheless have unpleasant odors. Compositions of the invention and their embodiments in face masks or air filters can reduce the concentration of unpleasant odorants in inhaled air.

Sulfhydryl Compounds.

Sulfhydryl compounds and mercaptans are potent, unpleasant odorants. These and related compounds are trapped by iron compounds including iron phthalocyanine. Compositions of the invention and their embodiments therefore are useful for reducing exposure of people to ambient sulfhydryl odorants.

Ammonia.

Ammonia is a toxic irritant and has an unpleasant odor. Cuprous iodide has the ability to coordinate with nucleophilic compounds including ammonia. Compositions of the invention and their embodiments therefore are useful for reducing exposure of people to ammonia.

Carbon Monoxide and Hydrogen Cyanide.

In addition to toxic oxidizing gases, air pollution can contain toxic reducing gases such as carbon monoxide and hydrogen cyanide. The toxicity of these gases is mediated in part by their binding to the iron chelated in heme, the oxygen-carrying subunit of hemoglobin. Iron phthalocyanine is structurally analogous to heme, which is a porphyrin. Reducing gases that otherwise bind to heme also bind to iron phthalocyanine; the inclusion of iron phthalocyanine in a composition of the invention applied to mask material thus traps reducing gases and protects a person wearing such a face mask.

Polycyclic Aromatic Hydrocarbons.

Polycyclic aromatic hydrocarbons (PAHs) are planar aromatic compounds produced by combustion of carbon-based fuels or tobacco. Many PAHs are carcinogens, including benzo[a]pyrene and benz[a]anthracene ($C_{18}H_{12}$), acting by intercalating between base pairs of DNA and causing chemical damage and replication errors. PAHs are major carcinogens in tobacco smoke, and are found in roadside air and dust or in other locations in the vicinity of combustion of fossil fuels.

Planar PAHs bind to phthalocyanine molecules, including iron phthalocyanine, by interaction between the aromatic ring structures on both classes of molecules. The metal phthalocyanine of compositions of the invention extract volatile or airborne PAH molecules. The compositions and embodiments of the invention such as face mask and air filters protect against inhalation or contact with PAH, thereby reducing risks associated with exposure to PAH in second-hand tobacco smoke, or PAH in air polluted by combustion of fossil fuels, wood or other carbon-based fuels.

Volatile Organic Compounds.

A large variety of volatile organic compounds (VOCs) can be found in air pollution, and unlike most air pollution constituents, they are generally higher in concentration indoors. VOCs are commonly emitted from paints and lacquers, paint strippers, cleaning supplies, building materials and furnishings, office equipment, and fuels, including cooking fuels.

Adverse health effects of VOCs can range from eye, nose, and throat irritation to central nervous system damage. The severity of damage depends on the type of VOCs and the concentration in inhaled air.

Compositions of the invention and their embodiments as face mask or air filters can trap or inactivate a variety of VOC including aldehydes, ketones, pyridine and other aromatic amines.

Cuprous iodide, or copper salts in its +1 oxidation state, can form coordination complexes with a large variety of nucleophilic compounds; it has been used as a coating for electrodes to detect a wide variety of VOCs; similar interaction between cuprous iodide and VOCs in the mask material contributes to ability of compositions of the invention to trap VOCs.

Mercury Vapor.

Mercury is a liquid under most environmental conditions, with a melting point of −38.8 degrees Celsius. Liquid mercury has a high vapor pressure, so mercury vapor is generally present in the atmosphere, though at hazardous concentrations primarily in some industrial or medical environments and in areas around coal combustion or mining activities. Mercury vapor is toxic, especially affecting to the brain.

Cuprous iodide, a key constituent of the pollutant-inactivating composition of the disclosure, rapidly and efficiently complexes with mercury vapor, forming copper tetraiodomercurate ($Cu_2HgI_4$). This property has known utility for use of cuprous iodide as a reagent for detection of ambient mercury vapor; for example, paper treated with cuprous iodide has been used as a detector for ambient mercury vapor.

The pollutant-inactivating composition of the disclosure provides protection against vaporized mercury in the environment by trapping it within the filter matrix and thereby reducing amounts that are available for inhalation.

Dosimeter for Oxidizing Gases

A disposable protective mask comprising a composition of the invention contains a finite amount of active agents that neutralize toxic oxidizing gases such as nitrogen dioxide, sulfur dioxide or ozone. Because the active composition is typically enclosed between filtration layers of a face mask, it does not offer direct visual cues about effective duration of action. Dosimeters that change colors based on cumulative exposure to specific oxidizing gases provide a means for gauging total exposure to oxidizing gases, with color change proportional to the concentration×time product of gas exposure. Calibrated color changes correspond to the active lifetime of a composition of the invention in a face mask or air filter and provides a signal for the user to discard and replace the mask or filter to maintain protection against ambient oxidizing gases. In one embodiment, a small colorimetric dosimeter, in the form of a small textile patch, is affixed to the mask or air filter.

Reagents that change color upon exposure to nitrogen dioxide are known, for example diphenylamine acidified with an approximately equal weight of oxalic acid as disclosed in U.S. Pat. No. 3,574,552 to Rakowski, hereby incorporated by reference. However, instead of applying diphenylamine and oxalic acid to a silica gel matrix as in that disclosure, in one embodiment the reagents are applied to polypropylene nonwoven textile material. An advantageous textile for this purpose is polypropylene spunbond fabric that has previously been coated with aqueous polyvinyl alcohol which has been allowed to dry, prior to application of a methanolic solution of diphenylamine and oxalic acid, which is then allowed to integrate into the polyvinyl alcohol coated textile by solvent evaporation. Such a dosimeter textile is white or light blue, and turns green during exposure to nitrogen dioxide, with sensitivities appropriate for a color change approximating the useful lifetime of a face mask or air filter of the invention. Similar colorimetric dosimeter textiles are optionally fabricated for monitoring cumulative exposure to sulfur dioxide, ozone or mercury vapor using reagents known in the art but applied to polypropylene coated with polyvinyl alcohol for use in the present invention, especially when the dosimeter is affixed to a face mask or air filter. Suitable reagents for monitoring sulfur dioxide include a mixture of phenolsulfonephthalein and sodium carbonate, or phenol red or bromothymol blue dyes, as disclosed in U.S. Pat. No. 4,348,358 to McKee and U.S. Pat. No. 3,378,348 to McConnaughey, respectively, hereby incorporated by reference. A suitable reagent for detecting mercury vapor is cuprous iodide, yielding a pink stain in the presence of mercury vapor.

Example 11

Colorimetric Dosimeter Patch for Nitrogen Dioxide

A 1.76 cm$^2$ circular discs of polypropylene spunbond textile was coated with polyvinyl alcohol by dipping it in a 4% w/w aqueous solution of polyvinyl alcohol, removing excess, and allowing the textile to air dry. A methanolic solution (0.75 mL) containing diphenylamine (6.3% w/w) and oxalic acid (6.3% w/w) was applied evenly to the polypropylene material and blotted gently with a paper towel to remove excess liquid. The treated polypropylene was allowed to air-dry. Exposure to nitrogen dioxide approximating 12 hours in ambient urban air pollution caused the white or light-blue color reagent on the textile to turn green.

Example 12

Colorimetric Dosimeter Patch for Nitrogen Dioxide and Ozone

A dosimeter that undergoes a color change in response to nitrogen dioxide or to ozone, both of which are hazardous air pollution components, was prepared based on the interaction of starch and iodine. Paper impregnated with starch and potassium iodide is known for detection of iodine or oxidants, but requires application of moisture for activity. Once moistened, starch paper has inadequate stability, both for storage and for maintaining hydration during use, to serve as the basis for an air pollution dosimeter. Furthermore, carbonic acid derived from atmospheric carbon dioxide oxidizes potassium iodide, potentially yielding a signal that is not related to hazardous oxidizing gases. It was found that glycerol can replace hydration with water, and that controlling pH with sodium bicarbonate or sodium carbonate can prevent iodide oxidation and consequent discoloration caused by atmospheric carbon dioxide. The result is an extremely sensitive dosimeter for nitrogen dioxide and ozone that does not require exogenous water for activation, and which is stable when stored in a closed, airtight package.

A suitable dosimeter is produced by treating a textile with a solution of reagents. A 1000 mL portion of textile treatment solution was prepared using 800 mL of Part A and 200 ml of Part B, both described below.

Part A: 8 grams of corn starch were added to 40 mL distilled water in a small closed container and shaken to form a slurry. 660 ml distilled water were heated to boiling and the 40 ml starch slurry was added to the 660 ml of water at boiling temperature. The starch rapidly gelled and became translucent. 100 mL glycerol and 3 grams of potassium iodide were added and stirred to dissolve, yielding total volume of 800 ml of Part A.

Part B is a buffer that prevents formation of carbonic acid from atmospheric $CO_2$ and oxygen in the presence of moisture. At the indicated concentration, when dried on to the polyester textile, or other suitable cellulosic material, the buffer does not interfere with reaction of oxidizing gases (nitrogen dioxide or ozone) with iodide or with the color change indicating their presence. However, the buffer prevents color changes due to $CO_2$ during storage, especially if the dosimeter is packaged with only a small volume of air. For preparation of 200 mL of Part B, 0.52 grams of sodium bicarbonate ($NaHCO_3$) and 0.04 grams sodium hydroxide (NaOH) were added to 200 ml distilled water and stirred to dissolve.

For application of the dosimeter solution to a textile, 800 mL of Part A and 200 mL of B were mixed together, yielding a total volume of 1000 mL solution. Polyester textile was immersed into the composition for approximately 30 seconds, removed, drained, and gently blotted to remove excess liquid. The treated textile was allowed to dry at room temperature or alternatively in an oven at 50 degrees Celsius. The weight gain of the textile after drying was approximately 60%. Pieces of the treated polyester textile were packaged and sealed in ziplock plastic bags as soon as they were dry. Treated and dried polyester was white in appearance and not sticky to the touch. In airtight sealed plastic bags, it remained white for at least four months. When exposed to ambient outdoor air in a suburban or urban environment, the dosimeter gradually turns brown, in proportion to exposure to the potentially hazardous oxidizing gases nitrogen dioxide or ozone. A dark brown color indicates to the user that they should replace the anti-pollution mask of the invention at the time of the specified color change to maintain optimum protection from environmental air pollution. The dosimeter furthermore reinforces to the user that their environment contains potentially harmful, though generally invisible, air pollution constituents, as a motivation to take protective measures, including wearing a mask treated with a composition of the invention.

What is claimed is:

1. A composition for coating textiles or filter materials to reduce hazards associated with exposure to air pollution, the composition comprises an aqueous solution of (i) an inorganic iodide compound, (ii) a metal phthalocyanine, and (iii) polyvinylpyrrolidone.

2. The composition of claim 1, wherein the inorganic iodide compound is cuprous iodide, the metal phthalocyanine is iron phthalocyanine.

3. The composition of claim 1 further comprising a humectant selected from at least one of a non-ionic surfactant comprising a sugar alcohol moiety including but not limited to polysorbate 20, polysorbate 40, polysorbate 60, polysorbate 80, sodium pyroglutamate, xylitol and sorbitol.

4. The composition of claim 3, wherein (i) cuprous iodide is between 0.25% and 5% by weight of the aqueous solution, (ii) iron phthalocyanine is between 0.25% and 2% by weight of the aqueous solution, (iii) the polyvinylpyrrolidone is between 1% and 5% of the aqueous solution, and (iv) polysorbate 20 is between 0.5% and 1% of the aqueous solution.

5. The composition of claim 1 further comprising titanium dioxide.

6. The composition of claim 1 further comprising cyclodextrin.

7. A textile having fibers coated with the composition of claim 1.

8. The textile of claim 7 wherein the textile is selected from at least one of polyester, polypropylene, polyethylene, nylon, rayon and cotton.

9. The composition of claim 4, wherein (i) the inorganic iodide compound is between 0.25% and 5% by weight of the aqueous solution, (ii) the metal phthalocyanine is between 0.25% and 2% by weight of the aqueous solution, (iii) the polyvinylpyrrolidone is between 1% and 5% of the aqueous solution, (iv) the humectant agent is between 0.5% and 1% of the aqueous solution.

* * * * *